(12) United States Patent
Foss

(10) Patent No.: US 9,288,319 B2
(45) Date of Patent: Mar. 15, 2016

(54) CALL MANAGEMENT SYSTEM

(71) Applicant: Aaron Foss, Port Jefferson, NY (US)

(72) Inventor: Aaron Foss, Port Jefferson, NY (US)

(*) Notice: Subject to any disclaimer, the term of this patent is extended or adjusted under 35 U.S.C. 154(b) by 0 days.

(21) Appl. No.: 14/109,994

(22) Filed: Dec. 18, 2013

(65) Prior Publication Data

US 2015/0172460 A1   Jun. 18, 2015

(51) Int. Cl.
H04M 3/42 (2006.01)
H04M 1/56 (2006.01)
H04M 15/06 (2006.01)
H04M 3/436 (2006.01)
H04M 3/54 (2006.01)

(52) U.S. Cl.
CPC .......... *H04M 3/436* (2013.01); *H04M 3/4365* (2013.01); *H04M 3/42059* (2013.01); *H04M 3/42348* (2013.01); *H04M 3/54* (2013.01)

(58) Field of Classification Search
CPC ... H04M 3/436; H04M 1/663; H04M 7/0033; H04M 3/42059
USPC .................. 379/210.02, 142.06, 196, 210.03, 379/211.01, 201.01, 142.01, 142.07
See application file for complete search history.

(56) References Cited

U.S. PATENT DOCUMENTS

| | | |
|---|---|---|
| 4,278,844 A | 7/1981 | Jones |
| 5,408,525 A | 4/1995 | Eldering |
| 5,651,053 A | 7/1997 | Mitchell |
| 5,655,013 A | 8/1997 | Gainsboro |
| 5,828,742 A | 10/1998 | Khalid |
| 5,999,606 A | 12/1999 | Weishut |
| 6,130,937 A | 10/2000 | Fotta |
| 6,549,619 B1 | 4/2003 | Bell |
| 6,859,528 B1 | 2/2005 | Welte |
| 6,990,187 B2 | 1/2006 | MacNamara |
| 7,103,167 B2 | 9/2006 | Brahm et al. |
| 7,233,656 B2 | 6/2007 | Bedingfield |
| 7,295,660 B1 * | 11/2007 | Higginbotham et al. ..... 379/196 |
| 7,756,262 B2 | 7/2010 | Caspi et al. |
| 8,346,881 B1 | 1/2013 | Cohen |
| 8,577,002 B2 * | 11/2013 | Stein et al. ............... 379/142.06 |

* cited by examiner

*Primary Examiner* — Thjuan K Addy
(74) *Attorney, Agent, or Firm* — Vadim A. Gordin

(57) ABSTRACT

Systems and methods for deploying and implementing an intelligent call screening and handling system are described. Rather than relying on inline solutions or proprietary interconnects at the carrier level as is the case in the prior art, one aspect of the claimed invention is to use existing functionalities of PSTN infrastructure including for instance simultaneous ring and call forwarding to create a call screening and handling system that is simple to deploy and substantially transparent to the user.

16 Claims, 3 Drawing Sheets

CALL MANAGEMENT SYSTEM

CLAIM OF PRIORITY

This application is related to and claims priority from application No. 61/805,243 filed on Mar. 26, 2013 which is incorporated by reference herein in its entirety.

BACKGROUND/FIELD

In the field of telephonic communications, it is often beneficial to intercept a phone call before it arrives at its intended number. The reasons for this may be the blocking of telemarketer calls, conditional call forwarding, or intelligent voicemail systems.

Consequently, systems are disclosed herein for improving the function and utility of existing telephonic networks.

SUMMARY

According to certain embodiments of the present disclosure, a system for handling incoming calls to a phone number X is described herein, the system comprising; a phone line corresponding to X, a screening computer distinct from X, and a telephonic routing system, wherein the telephonic routing system is configured such that the call will be connected by the routing system to whichever of the two is first to pick up the line, and the screening computer is configured to automatically pick up the line if a screening criteria Y evaluated by the computer is met, thereby intercepting the call; while allowing the call to ring through and be connected to X if Y is not met.

According to further embodiments of the present disclosure, Y compares the incoming call to a whitelist of allowed numbers or callers which are always allowed to ring through to X.

According to further embodiments of the present disclosure, Y compares the incoming call to a blacklist of disallowed numbers or callers which are always intercepted before ringing through to X.

According to further embodiments of the present disclosure, Y compares a portion of the incoming call's metadata to conditional statements stored on the computer before determining whether to intercept the call.

According to further embodiments of the present disclosure, the incoming call is assigned a standardized score Z by the computer based on at least one criteria selected from, previous malicious calls from the originating number, the geographic region of the originating number, the number block of the originating number, caller identity, previous grading of the caller by the owner of X, previous grading of the caller by other users within the system, previous grading of the caller by government or consumer protection agencies, and Y compares Z to a call threshold W thereby determining whether the call will be intercepted.

According to further embodiments of the present disclosure, calls that are intercepted by the computer are subjected to a reverse Turing test, and if the caller passes the reverse Turing test, the call is reconnected to X.

According to further embodiments of the present disclosure, Y compares the incoming call to a set of conditions stored on the computer selected from at least one of the following: temporary call forwarding, a third party conditional API or an API call.

According to further embodiments of the present disclosure, a call that has been intercepted by the computer is handled based on the preferences of the owner of X, selected from at least one of the following the call is disconnected, the call is forwarded to a mailbox, the call or data about it is forwarded to a $3^{rd}$ party API or web service, the call is forwarded to another number, the call status is communicated to a physical device for haptic, acoustic, or visual communication to the user.

According to further embodiments of the present disclosure, a system for handling incoming calls to a phone number X is disclosed herein; the system comprising, a phone line X, a screening computer, and a telephonic routing system, wherein the telephonic routing system is configured for an incoming call to sequentially ring the screening computer and the X, wherein the screening computer picks up the line if a screening criteria Y evaluated by the computer is met, thereby intercepting the call.

According to further embodiments of the present disclosure, a system for handling incoming calls to a phone number X is disclosed herein; the system comprising, a phone line corresponding to X, a screening computer distinct from X, and a telephonic routing system, wherein the telephonic routing system is configured such that the call will be connected by the routing system to whichever of the two is first to pick up the line, and the screening computer is configured to automatically pick up the line if a screening criteria Y evaluated by the computer is met, thereby intercepting the call; while allowing the call to ring through and be connected to X if Y is not met, wherein Y compares the incoming call to a blacklist of disallowed numbers or callers which are intercepted before ringing through to X.

According to further embodiments of the present disclosure, a telephone management system for use in a simultaneous ring environment for screening incoming calls to a phone number at a location X is disclosed herein, the system comprising; a screening computer disposed away from X, wherein the screening computer is operatively configured to pick up and thereby intercept a telephone call in the event that the meta-data for the incoming call matches that of potentially unwanted callers.

BRIEF DESCRIPTION OF THE FIGURES

In the figures, certain connection schemes and logic diagrams are shown. These are only several exemplary embodiments which implement the systems and methods disclosed in the appended claims.

DETAILED DESCRIPTION OF THE FIGURES

Figure 1:
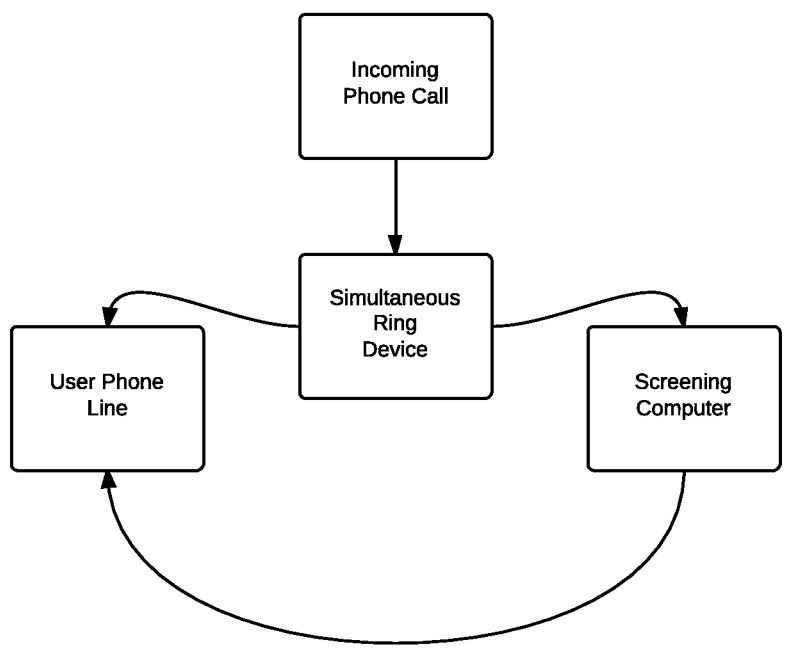
FIG. 1 shows a block diagram of the connection scheme in a simultaneous ring implementation of the present invention.

Referring now to FIG. 1, in a first exemplary embodiment of the present disclosure, a user's phone line is configured within a telephonic routing system such that incoming calls intended for a user's phone line simultaneously ring at the user's phone line and a screening computer. According to accepted simultaneous ring practice, the telephonic routing system connects the incoming call to whichever of these two picks up the line first. The screening computer is configured such that at least one screening criterion is evaluated by the screening computer upon the arrival of incoming calls. These screening criteria include for instance the identity of the caller, the time of the call, the current status of the called party, or other screening criteria described below. If that screening criterion is met, the screening computer picks up the call, thereby intercepting the call into the call management system and allowing it to be handled according to the preferences of the line's owner. These handling preferences include for instance disconnecting the call, subjecting the caller to a reverse Turing test before reconnecting the call to its intended target, presenting the caller a menu of routing options, forwarding the call to a mailbox, playing a pre-recorded message, or other handling options described below.

If the screening criteria are not met, then the screening computer does not intercept the call and it is allowed to ring through to the user's phone line.

Figure 2:
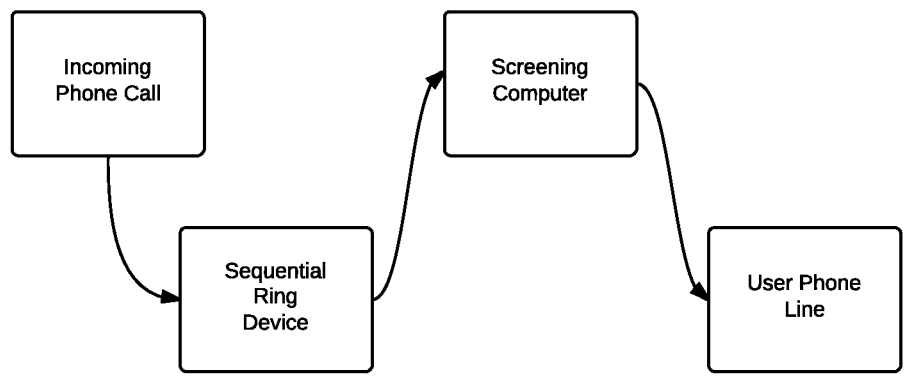
FIG. 2 shows a block diagram of the connection scheme in a sequential ring implementation of the present invention.

Referring now to FIG. 2, in a second exemplary embodiment of the present disclosure, a phone line is configured within a telephonic routing system such that incoming calls to a user's phone line are first routed to a screening computer and then to the user's phone line. According to accepted sequential ring practice, if upon ringing, the screening computer returns a busy signal, then the call is routed to the next phone line in the sequence, which in this case is the user's phone line. Alternatively, if the screening computer picks up the line upon the screening criteria being met, then the call is intercepted by the screening computer and processed in the manner determined by the user's preferences.

Figure 3:
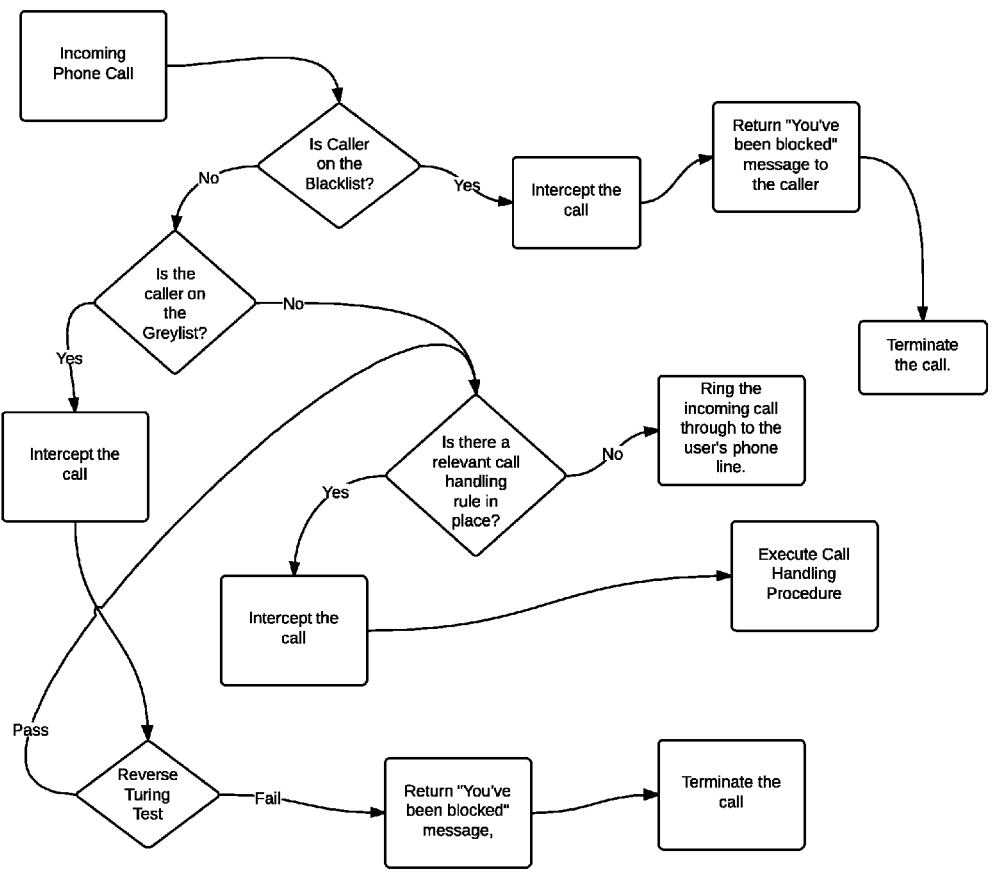
FIG. 3 shows a flow chart of operational logic in telemarketing blocking implementation of the present invention.

Referring now to FIG. 3, an exemplary embodiment of the screening computer logic for call blocking is shown. The implementation shown in FIG. 3 can be executed using the connection scheme of either FIG. 1 or 2. In this exemplary embodiment, the call management system is configured for screening of automated telemarketing calls.

Upon an incoming call ringing the line at the screening computer, the metadata for the incoming call is checked against an absolute blacklist. This absolute blacklist may be comprised of the identities of callers and phone number blocks that are associated with repeat offenders of do-not-call lists maintained by the Federal Trade Commission, state agencies, and private consumer protection agencies, private consumer protection groups, or an internal blacklist of distrusted callers maintained within the system. If a caller is identified as being on the blacklist, then the call is answered and thereby intercepted by the system, the caller is played a "you've been blocked" message, and the call is disconnected.

If the caller is not on the blacklist, they are checked against a greylist, which consists of callers who are suspected of being telemarketers. The "suspicion" or degree thereof may arise from previous complaints from users of the system, from listing on some, but not all of the blacklist directories, or a failure of the caller to previously successfully complete the reverse Turing test administered by the system. If an incoming caller is identified as being on the greylist, he is subjected to a reverse Turing test, or one that determines that the caller is human. A reverse Turing test can for instance comprise asking the caller to enter a randomly selected number via touch tones, asking the caller to perform arithmetic and enter a result via touch tones, asking the caller a rudimentary but out-of-context question like "what day was it yesterday", "what vegetable is in a tomato salad", "what sound does a cow make", or other reverse Turing test known in the computational and telephonic arts. If the caller fails the reverse Turing test and is determined to likely be an automated telemarketer, then a "You've been blocked" message is played and the call is terminated.

If the caller passes the Turing test, the system checks whether there are any relevant call handling rules in place and if so executes the appropriate action. Examples of criteria for call handling rules include the time of day, vacation or meeting status of the called party, caller identity, metadata from the call, caller location, privacy settings of the caller's ID. Examples of call handling actions include disconnecting a call, subjecting a call to a Turing test or reverse Turing test, forwarding the call to another number, forwarding the call to a voice mailbox, communicating the call status to an API or web interface outside the system, communicating the call status to a physical device for haptic, acoustic, or visual communication to a user.

An example of a call handling action is "if it is between 5 and 7 pm" then "route all calls to voicemail and send an SMS message regarding the call to a predetermined number." A second example of a call handling action is "if the it is between 2 and 5 pm and the caller is part of the line owner's immediate family" then "forward the call the owner's home phone." A third example of a call handling action is "if a given phone number is calling the user's number" then "do not intercept the call, but send an API call to the IfThisThenThat.com® server which in turn signals a flashing light on the user's desk to blink"

If the caller passes the reverse Turing test and there are no relevant call handling procedures, then the caller is reconnected to the user's phone line. If no criteria for the screening computer to pick up the phone have been met, then the call is allowed to ring through to the user's phone line unimpeded.

According to certain embodiments of the present disclosure, there is a whitelist stored on the screening computer which contains numbers which are always allowed to ring through to the owner's phone line regardless of the result of any other screening criteria.

Although certain exemplary embodiments of the present disclosure have been described in the foregoing with regards to specific connection and logical structures, these are listed as exemplary non-limiting means of implementing the appended claims.

What is claimed is:

1. A system for handling incoming calls to a phone number X; the system comprising, a phone line corresponding to X, a screening computer connected to phone number Z distinct from X, and a telephonic routing system, wherein the telephonic routing system is configured such that the call will be connected by the routing system to the first of X or Z to pick up the line, and the screening computer is configured to automatically pick up the line if a screening criteria Y evaluated by the computer is met, thereby intercepting the call; while allowing the call to ring through and be connected to X if Y is not met, wherein the incoming call is assigned a standardized score Z by the computer based on at least one criteria selected from, previous malicious calls from the originating number, the geographic region of the originating number, the number block of the originating number, caller identity, previous grading of the caller by the owner of X, previous grading of the caller by other users within the system, previous grading of the caller by government or consumer protection agencies, and Y compares Z to a call threshold W thereby determining whether the call will be intercepted.

2. The system of claim 1, wherein Y compares the incoming call to a whitelist of allowed numbers or callers which are always allowed to ring through to X.

3. The system of claim 1, wherein Y compares the incoming call to a blacklist of disallowed numbers or callers which are always intercepted before ringing through to X.

4. The system of claim 1, wherein Y compares a portion of the incoming call's metadata to conditional statements stored on the computer before determining whether to intercept the call.

5. The system of claim 1, wherein calls that are intercepted by the computer are subjected to a reverse Turing test, and if the caller passes the reverse Turing test, the call is reconnected to X.

6. The system of claim 1, wherein Y compares the incoming call to a set of conditions stored on the computer selected from at least one of the following: temporary call forwarding, a third party conditional API or an API call.

7. The system of claim 1, wherein a call that has been intercepted by the computer is handled based on the preferences of the owner of X, selected from at least one of the following the call is disconnected, the call is forwarded to a mailbox, the call or data about it is forwarded to a $3^{rd}$ party API or web service, the call is forwarded to another number, the call status is communicated to a physical device for haptic, acoustic, or visual communication to the user.

8. A system for handling incoming calls to a phone number X; the system comprising, a phone line X, a screening computer at a phone number Z distinct from X, and a telephonic routing system, wherein the telephonic routing system is configured for an incoming call to sequentially ring the screening computer and then X, wherein the screening computer picks up the line if a screening criteria Y evaluated by the computer is met, thereby intercepting the call, wherein the incoming call is assigned a standardized score Z by the computer based on at least one criteria selected from, previous malicious calls from the originating number, the geographic region of the originating number, the number block of the originating number, caller identity, previous grading of the caller by the owner of X, previous grading of the caller by other users within the system, previous grading of the caller by government or consumer protection agencies, and Y compares Z to a call threshold W thereby determining whether the call will be intercepted.

9. The system of claim 8, wherein Y compares the incoming call to a whitelist of allowed numbers or callers which are always allowed to ring through to X.

10. The system of claim 8, wherein Y compares the incoming call to a blacklist of disallowed numbers or callers which are always intercepted before ringing through to X.

11. The system of claim 8, wherein Y compares a portion of the incoming call's metadata to conditional statements stored on the computer before determining whether to intercept the call.

12. The system of claim 8, wherein calls that are intercepted by the computer are subjected to a reverse Turing test, and if the caller passes the reverse Turing test, the call is reconnected to X.

13. The system of claim 8, wherein Y compares the incoming call to a set of conditions stored on the computer selected from at least one of the following: temporary call forwarding, a third party conditional API or an API call.

14. The system of claim 8, wherein a call that has been intercepted by the computer is handled based on the preferences of the owner of X, selected from at least one of the following the call is disconnected, the call is forwarded to a mailbox, the call or data about it is forwarded to a $3^{rd}$ party API or web service, the call is forwarded to another number, the call status is communicated to a physical device for haptic, acoustic, or visual communication to the user.

15. A system for handling incoming calls to a phone number X; the system comprising, a phone line corresponding to X, a screening computer at a phone number Z with Z being distinct from X, and a telephonic routing system, wherein the telephonic routing system is configured such that the call will be connected by the routing system to whichever of Z or X is first to pick up the line, and the screening computer is configured to automatically pick up the line if a screening criteria Y evaluated by the computer is met, thereby intercepting the call; while allowing the call to ring through and be connected to X if Y is not met, wherein Y compares the incoming call to a blacklist of disallowed numbers or callers which are to be intercepted before ringing through to X.

16. A telephone management system for screening incoming calls to a phone number at a location X, and a screening computer at a location Z distinct from X, with X and the screening computer interconnected using the PSTN simultaneously ring feature, the system comprising; a screening computer which is operatively configured to pick up the line at Z and thereby intercept a telephone call to X in the event that the metadata for the incoming call matches that of potentially unwanted callers.

* * * * *